US 7,473,489 B2

(12) United States Patent
Bakos et al.

(10) Patent No.: US 7,473,489 B2
(45) Date of Patent: Jan. 6, 2009

(54) BATTERY TERMINAL BOLT

(75) Inventors: Peter L. Bakos, Barrington, IL (US); Robert Neal, Inverness, IL (US)

(73) Assignee: Okabe Company, Inc., Vernon Hills, IL (US)

( * ) Notice: Subject to any disclaimer, the term of this patent is extended or adjusted under 35 U.S.C. 154(b) by 0 days.

(21) Appl. No.: 10/663,638

(22) Filed: Sep. 16, 2003

(65) Prior Publication Data

US 2005/0058525 A1   Mar. 17, 2005

(51) Int. Cl.
*H01M 2/02* (2006.01)
(52) U.S. Cl. .................. 429/178; 429/121; 429/181; 439/202; 439/203
(58) Field of Classification Search ............... 411/402, 411/424, 426, 910; 429/121, 178, 181, 61.64, 429/203, 202; 200/61.64; 439/203, 202
See application file for complete search history.

(56) References Cited

U.S. PATENT DOCUMENTS

| | | | |
|---|---|---|---|
| 1,043,965 A * | 11/1912 | O'Connor et al. ........... 408/156 |
| 1,926,925 A | 9/1933 | Wescott |
| 2,135,570 A | 11/1938 | Ellis |
| 2,353,531 A * | 7/1944 | Whitney ..................... 411/410 |
| 3,505,636 A | 4/1970 | McDowell |
| 3,584,667 A * | 6/1971 | Reiland ....................... 81/460 |
| 3,926,674 A | 12/1975 | Jonville et al. |
| 4,269,248 A * | 5/1981 | MacLean et al. ............ 411/186 |
| 4,274,460 A * | 6/1981 | Egner .......................... 411/353 |
| 4,621,963 A * | 11/1986 | Reinwall .................... 411/369 |
| 4,643,511 A | 2/1987 | Gawlik et al. |
| 4,659,267 A * | 4/1987 | Uno et al. ....................... 411/5 |
| 4,691,980 A | 9/1987 | Sandor |
| 4,740,179 A | 4/1988 | Padget |
| 4,797,111 A | 1/1989 | Ackmann |
| 4,867,625 A * | 9/1989 | Dixon .......................... 411/361 |
| 4,909,691 A * | 3/1990 | Bogel .......................... 411/531 |
| 4,936,799 A | 6/1990 | Woodall |
| 5,201,625 A * | 4/1993 | Takenouchi et al. ......... 411/369 |
| 5,346,408 A | 9/1994 | Chupak |
| 5,533,764 A * | 7/1996 | Williamson ................. 285/212 |
| 5,595,511 A | 1/1997 | Okada |
| 5,704,749 A * | 1/1998 | Landgrebe ............... 411/366.2 |

(Continued)

FOREIGN PATENT DOCUMENTS

DE   199 36 797 C1   10/2000

OTHER PUBLICATIONS

International Search Report (PCT/US04/30148), Jan. 26, 2005, 3 pages.

*Primary Examiner*—Patrick Ryan
*Assistant Examiner*—Ben Lewis
(74) *Attorney, Agent, or Firm*—Mayer Brown LLP

(57) ABSTRACT

A battery terminal bolt preferably having a head portion, a washer portion, a sealing portion and a threaded portion. The sealing portion is disposed between the washer portion and the threaded portion and is preferably in the form of a frustoconical shape that allows the bolt to be substantially sealed when placed in an insert mold. The battery terminal bolt's washer portion has a geometry that substantially reduces abusive field torque failures and also provides increased pullout strength. In a preferred embodiment, the washer portion contains semi-circular projections in a radial pattern around longitudinal axis of the battery terminal bolt.

16 Claims, 2 Drawing Sheets

U.S. PATENT DOCUMENTS

| | | | |
|---|---|---|---|
| 5,919,020 A * | 7/1999 | Walther | 411/399 |
| 6,176,665 B1 * | 1/2001 | Bondarowicz et al. | 411/424 |
| 6,227,914 B1 | 5/2001 | Lee et al. | |
| 6,848,934 B1 * | 2/2005 | McCarthy | 439/427 |
| 6,902,095 B2 * | 6/2005 | Ratte et al. | 228/115 |
| 2003/0215302 A1 * | 11/2003 | Lohr | 411/2 |

* cited by examiner

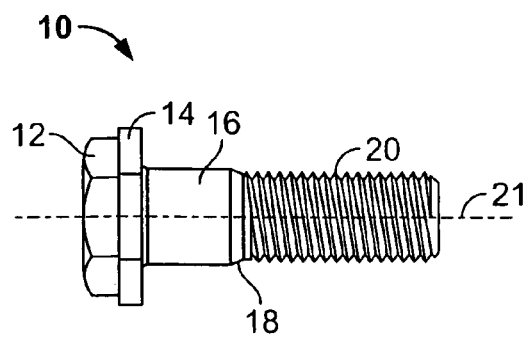
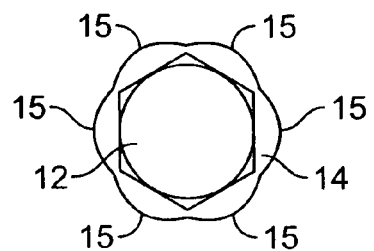
FIG. 1   FIG. 2
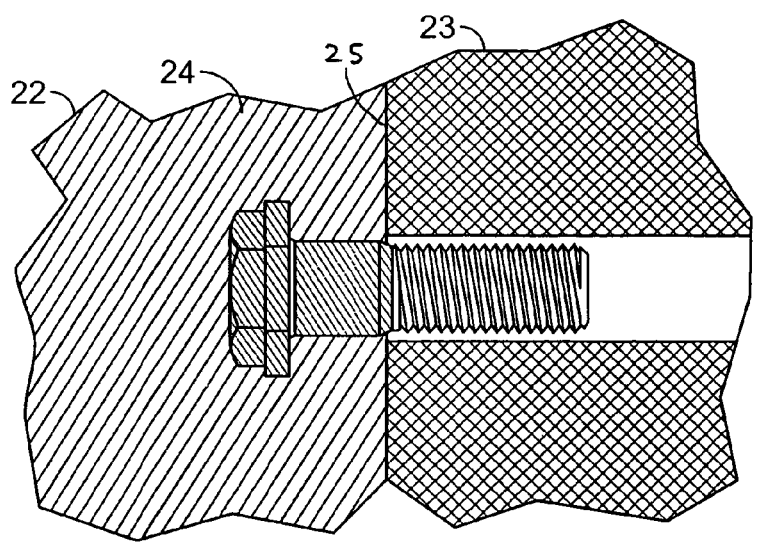
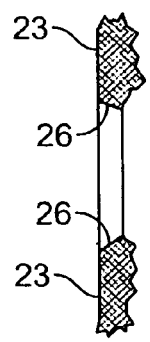
FIG. 3   FIG. 3A

BATTERY TERMINAL BOLT

FIELD OF INVENTION

This invention relates generally to batteries, and more particularly to battery terminals used to connect a battery to an automobile, boat, etc.

BACKGROUND OF INVENTION

In the field of batteries, and in particular batteries designed for heavy duty and marine applications, it is typical to supply a battery with battery terminals in the form of a threaded bolt. This threaded bolt terminal allows a user of the battery to attach various electrical leads (which contain an end portion having an insulated ring connector) to the battery terminal by sliding the ring connectors over the threaded terminal and then securing the ring connectors by use of a threaded wing nut or other type of nut. In order to attach such a threaded bolt terminal to a battery, manufactures of batteries typically insert mold a bolt into a lead-alloy subassembly, which subassembly is then connected to the battery's cells using methods commonly known in the art.

The insert molding of the battery terminal bolt into the lead-alloy subassembly presents a myriad of manufacturing and structural issues. Because the threaded portions of the bolt must be exposed for connection to electrical leads, the threaded portion of the bolt must be located outside of the mold cavity so as not to be encased with the lead-alloy. From a manufacturing standpoint, a problem with prior insert molding of battery terminal bolts is that poor shut-off characteristics (i.e., the seal between the mold itself and the bolt) allow for the lead-alloy to leak out of the mold cavity and onto the battery terminal bolt's threads. This leakage had the unintended and undesirable consequence of possibly preventing a firm connection between the battery leads and the battery terminal due to the wing nut, or other nut, being interfered with by the lead-alloy. Typically, where a shut-off point is designed around a bolt's threads, the lead will leak out of the mold cavity due to the helical profile of the bolt's threads. Also, if the shut-off point of the bolt is designed around the shank (i.e., the non-threaded portion of the bolt), this will also typically lead to leakage because of irregular surface and dimensional variations in the shank.

From a structural standpoint, the lead subassembly in which the battery terminal bolt is encased typically has relatively shallow dimensions since it must fit within the plastic cover of a battery. Accordingly, the head of the battery bolt (which is encased in the lead-alloy subassembly and is typically a hex-head bolt) must not be too deep along its longitudinal axis. Otherwise, a sufficient amount of lead-alloy will not be present above and below the battery bolt head, which can lead to a user inadvertently pulling out the bolt during normal use or the bolt working its way out of the subassembly through normal operation of the machinery to which it is attached, which presumably will generate a fair amount of vibration. Typically, a battery bolt's head and washer thickness must lie within a restricted profile envelope of less than 0.25 of an inch.

Also, from a structural standpoint, the battery terminal bolt must be able to withstand so-called "abusive field torque failures", which result, for instance, where a user applies too much torque to the wing nut or other nut attached to the terminal when tightening the nut. Such increased torque often times results in the battery bolt head rotating within the lead subassembly, therefore stripping the lead-alloy attachment points from the battery bolt head and causing a poor electrical connection between the battery bolt terminal and the battery's cells and/or leads. Such abuse field torque failures cannot be repaired, and require a user to purchase a new battery.

Accordingly, there is a need for a battery terminal bolt that will have increased shut-off capabilities during an insertion mold process.

There is also a need for a battery terminal bolt that will have sufficient pull-out strength while resisting abusive field torque failures.

Other needs will become apparent upon a review of the following detailed description, taken in conjunction with the drawings.

SUMMARY OF THE INVENTION

Consistent with the principles of the present invention, a battery terminal bolt preferably having a head portion, a washer portion, a sealing portion and a threaded portion is disclosed. The sealing portion is disposed between the washer portion and the threaded portion and is preferably in the form of a frustoconical shape that allows the bolt to be substantially sealed when placed in an insert mold. The battery terminal bolt's washer portion has a unique geometry that substantially reduces abusive field torque failures and also provides increased pull-out strength. In a preferred embodiment, the washer portion contains semi-circular projections in a radial pattern around longitudinal axis of the battery terminal bolt.

BRIEF DESCRIPTION OF THE DRAWINGS

FIG. 1 is a side elevational view of one preferred embodiment of the battery terminal bolt of the present invention.

FIG. 2 is a top plan view of the battery terminal bolt shown in FIG. 1.

FIG. 3 is a cross sectional view of the battery bolt shown in FIGS. 1 and 2, encased within an insert mold.

FIG. 3A is a cross sectional view of a mold seat.

DETAILED DESCRIPTION OF THE PREFERRED EMBODIMENT

Figure 4:
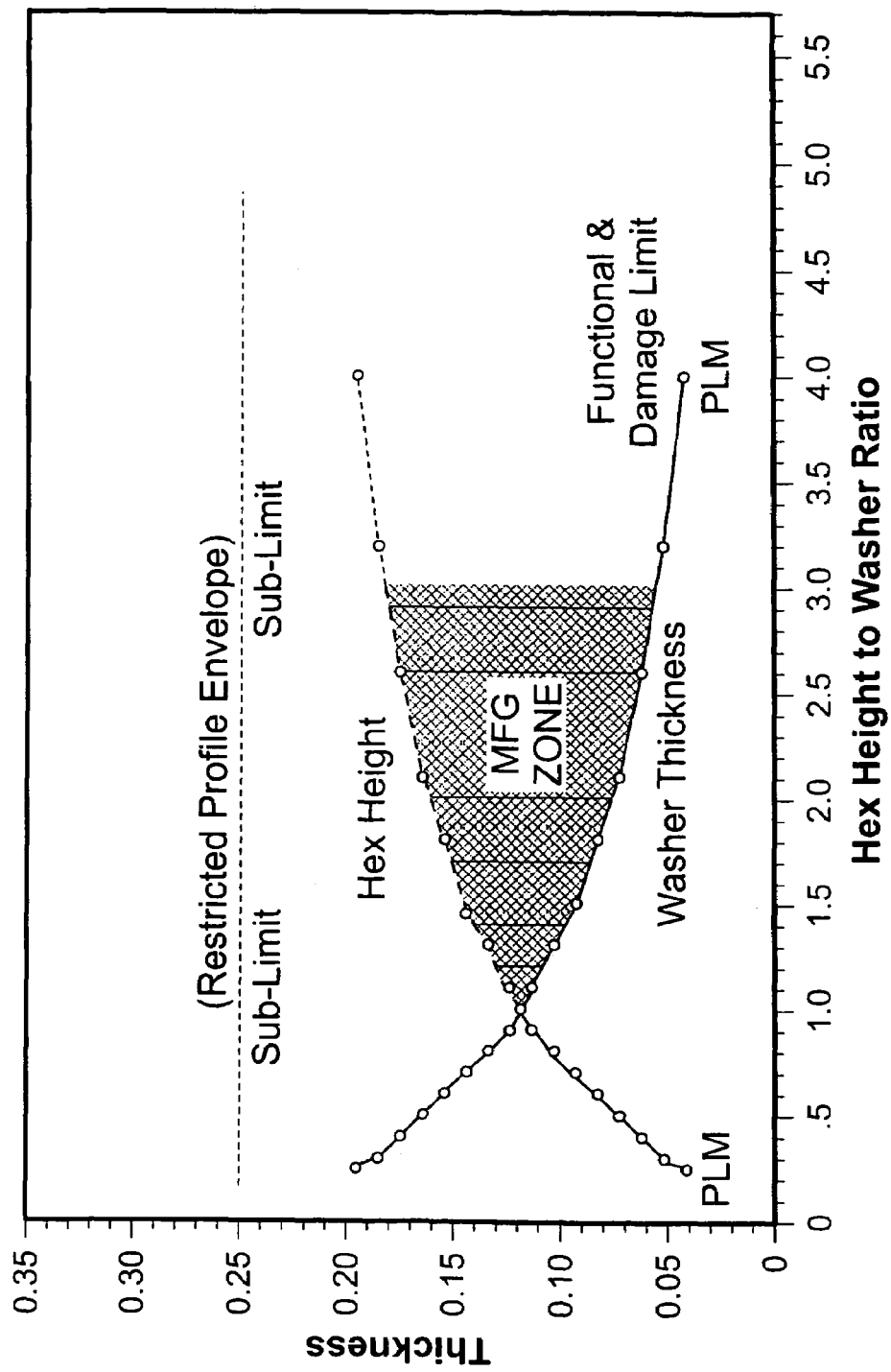
FIG. 4 is a chart showing the preferred hex height to washer thickness ratios for the present invention.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

As shown in FIG. 1, one embodiment of the battery bolt of the present invention is generally designated as reference numeral 10. The battery bolt 10 contains a head portion 12, a washer portion 14, a non-threaded portion 16, a sealing portion 18 and a threaded portion 20. Preferably head portion 12 is a polygon having six sides (i.e., a hex head), however those with skill in the art will recognize that a multitude of head geometries can be used, such as polygons having three, four, five, seven or more sides, allen heads, torx heads, etc. It is preferred that the head portion 12 have a height of 0.114 inches. Other head dimensions within practical manufacturing limits are also contemplated within the scope of the present invention.

The washer portion 14 preferably contains semi-circular projections 15 that extend radially from the longitudinal axis 21 of the bolt. However, it is within the scope of the present invention that projections of other geometries can be used.

For instance, and without limitation, triangular, rectangular and elliptical geometries can be used. It is preferred that the washer portion 14 have a height of 0.092 inches and a diameter of 0.750 inches. It will be appreciated, however, that other dimensions for the washer height and diameter within practical manufacturing limits are contemplated with the present invention. It is also within the scope of the present invention that multiple rows of projections can be used. For example there may be a first washer portion 14 that is spaced along the longitudinal axis from a second washer portion (not shown), a third washer portion (not shown), etc. It is also contemplated that the projections need not be in the form of an integrated washer, but can instead comprise projections extending radially from the outer diameter of the bolt 10 at locations distal from the head portion 12. Also, as will be appreciated, the bolt 10 need not contain both the head portion 12 and the washer portion 14. Indeed, the bolt may have only the head portion 12 or only the washer portion 14.

As noted above, the head portion 12 and washer portion 14 must typically fit within an envelope of less than 0.250 of an inch. It was found that to optimize the battery terminal bolt's torque resistance and pullout strength, it is preferred to have a hex height to washer thickness of 0.114 of an inch to 0.092 of an inch, which equates to a ratio of 1.24. However, as shown in FIG. 4, other preferred ratios can be used with the present invention. FIG. 4. shows the preferred manufacturing zone ("MFG Zone") for the head portion 12 height to the washer portion 14 thickness as a function of total thickness within the practical manufacturing limits "PML" of a battery bolt. As can be seen, a head portion height to washer portion thickness of 1.0 to 3.0 is preferred in the present invention. However, it will be appreciated that other ratios outside of this ratio range can be used with the present invention.

After the washer portion 14, there is a non-threaded portion 16. However, as those with skill in the art will recognize, the non-threaded portion can include threads, if desired for a particular application and/or the non-threaded portion can be removed from the bolt 10 altogether. The length of the non-threaded portion can be from 0.001 of an inch to any practical manufacturing length. Indeed, the purpose of the non-threaded portion is primarily to separate the head and washer portions from the sealing and threaded portions of the bolt 10, thus acting as a spacer between the two sections and providing additional length to the bolt 10, if desired.

Following the non-threaded portion 16 is sealing portion 18. Sealing portion 18 is preferably a frustoconical shape, with the widest part of the frustoconical shape abutting the non-threaded portion, and the narrowest part of the frustoconical shape abutting the threaded portion 20. Preferably the sealing portion 18 starts, at the end abutting the non-threaded portion 16, with a diameter 1% greater than the major diameter of the thread size used and ends, at the end abutting the threaded portion 20, with a diameter 1% greater than the minor diameter of the thread size used. It is also preferred that the sealing portion 18 length is a minimum of 10% of the maximum major diameter of the thread size used. The sealing portion, however, need not be frustoconical in shape, and can comprise any tapering shape, for example, convex, concave, circular, elliptical, parabolic or hyperbolic shapes and that the sealing portion may be of any length or diameter within practical manufacturing limits. Also, the sealing portion can comprise a frustoconical shape followed immediately by an inverted frustoconical shape, thus giving the sealing portion a "V" shape in cross-section. It is preferred that the sealing portion 18 is formed and/or machined into the bolt 10, before the bolt is threaded. Forming and/or machining the sealing portion 18 into the bolt provides for substantially uniform surfaces and dimensions on the sealing surface, which facilitates a tight seal in an insert mold.

Following the sealing portion 18 is threaded portion 20 which can include any type of thread dimensions suitable for a particular application. In the preferred embodiment, the threads are a minimum of 0.375 inches in length, and are of standard thread size and form. However, those with skill in the art will appreciate that any length and type of thread can be used with the present invention.

As noted above, the battery terminal bolt 10 is designed for use in batteries where a bolt must be insert molded into a lead subassembly. However, the bolt of the present invention can be used for other purposes and is not limited to insert molding applications. In order to insert mold the bolt into a subassembly, the head portion 12, washer portion 14, non-threaded portion 16, and a portion of the sealing portion 18 of the battery bolt 10 are enclosed within a mold cavity 22, as shown in FIG. 3. As can be seen, this arrangement leaves the threaded portion 20 and part of the sealing portion 18 outside of the mold cavity 22 and in a non-cavity portion of the mold 23. Subsequently, lead 24 is injected into the mold cavity 22 to form a lead subassembly for a battery, with the sealing portion 18 contacting a planar surface 25 of the subassembly. The sealing portion 18 provides a uniform surface that substantially seals the mold cavity 22 and substantially prevents lead from escaping the mold onto the threaded portion 20 of the bolt 10. To provide an even tighter seal, the seat portion of the mold 23, which mates with the sealing portion 18, may have a slightly tapered portions 26 that is intended to mate with the battery bolt's tapered sealing portion, as shown in FIG. 3.

Once the battery bolt 10 is insert molded into the lead subassembly, the properties of the bolt provide for increased resistance to abusive field torque without diminishing the bolt's pullout strength. Indeed, the projections 15 and head portion 12 act to resist the twisting forces exerted upon a battery bolt while battery terminals are being connected or detached. Also, the dimensions of the bolt and washer (i.e., the preferred ratio of 1.24) allows for sufficient lead to encase the battery bolt and provide sufficient pull-out strength.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A battery terminal, said battery terminal comprising:
   a bolt, wherein said bolt comprises in order
   a first portion, wherein said first portion comprises a head portion integrally connected to a washer portion, wherein said washer portion includes radial projections extending there from,
   a sealing portion connected to said first portion, and
   a threaded portion connected to said sealing portion; and
   a lead portion, wherein said lead portion is a lead casting, insert molded as molten lead around said first portion, said sealing portion preventing leakage of said molten metal from an insert mold cavity onto said threaded portion during said insert molding process.

2. The battery terminal of claim 1, wherein said first portion further comprises a shank portion integrally connected to and disposed between both of said washer portion and said sealing portion.

3. The battery terminal of claim 1, wherein said sealing portion of said bolt has a frusto-conical shape such that a first end of said sealing portion that is connected to said shank portion has a larger diameter than a second end of said sealing portion that is connected to said threaded portion.

4. The battery terminal of claim 2, wherein said threaded portion has a smaller diameter than said shank portion.

5. The battery terminal of claim 1, wherein the ratio of a height of said head portion to the thickness of said washer portion is 1.24.

6. The battery terminal of claim 1, wherein said radial projections are semi-circular.

7. The battery terminal of claim 3, wherein an outer surface of said sealing portion has a uniform surface finish for forming a tight seal with a sealing edge of an insert mold cavity.

8. The battery terminal of claim 7, wherein said outer surface of said sealing portion forms a substantial seal, on a circumferential plane thereof, with a substantially sharp edge of an insert mold cavity during the insert molding process, so as to prevent leakage of molten metal from inside said insert mold cavity onto said threaded portion.

9. The battery terminal of claim 1, wherein said threaded portion has helical threads disposed in an outer surface thereof.

10. The battery terminal of claim 1, wherein said lead portion is contained inside of a battery cell and electrically connected to said battery cell.

11. The battery terminal of claim 1, wherein said lead portion is further insert molded as molten lead around at least a part of said sealing portion of said bolt.

12. The battery bolt of claim 1, wherein the ratio of the height of said head portion to the thickness of said washer portion is between 1.0 to 3.0.

13. A method of insert molding a battery bolt comprising:
providing a battery bolt having a first portion and a sealing portion, wherein said first portion comprises a head portion integrally connected to a washer portion, wherein said washer portion includes radial projections extending therefrom, and wherein said sealing portion is tapered;
placing said first portion in a mold cavity; substantially sealing a portion of the mold cavity with said sealing portion; and
injecting lead into said mold cavity to form a lead subassembly in which said first portion is encased in said lead, wherein said lead is substantially retained in said mold cavity in part by said sealing portion.

14. The method of claim 13, wherein said first portion comprises a shank portion integrally connected to and disposed between both of said washer portion and said sealing portion.

15. The method of claim 13, wherein said first portion is a washer portion.

16. The method of claim 13, wherein said bolt further comprises a threaded portion that is located outside of said mold cavity.

* * * * *